United States Patent [19]

Shimoyama

[11] Patent Number: 5,723,029

[45] Date of Patent: Mar. 3, 1998

[54] PHOTO-ELECTRIC CHEMICAL APPARATUS USING CARBON CLUSTER ELECTRODE

[75] Inventor: Masashi Shimoyama, Kanagawa-ken, Japan

[73] Assignee: Ebara Research Co., Ltd., Fujisawa, Japan

[21] Appl. No.: 825,396

[22] Filed: Mar. 28, 1997

Related U.S. Application Data

[63] Continuation of Ser. No. 534,001, Sep. 25, 1995, abandoned, which is a continuation of Ser. No. 291,952, Aug. 17, 1994, abandoned.

[30] Foreign Application Priority Data

Aug. 23, 1993 [JP] Japan .................... 5-229407

[51] Int. Cl.⁶ .................................... H01L 31/0256
[52] U.S. Cl. ............... 204/242; 204/294; 205/340; 205/630; 136/291; 429/111
[58] Field of Search .......................... 204/242, 294; 205/340, 630; 136/291; 429/111

[56] References Cited

U.S. PATENT DOCUMENTS

| | | | |
|---|---|---|---|
| 3,925,212 | 12/1975 | Tchernev | 422/186 |
| 4,090,933 | 5/1978 | Nozik | 204/129 |
| 4,643,817 | 2/1987 | Appleby | 204/242 |
| 5,171,373 | 12/1992 | Hebard | 136/252 |
| 5,320,723 | 6/1994 | Kawakami | 204/140 |

OTHER PUBLICATIONS

Patent Abstracts of Japan; vol. 018, No. 161 (E-1526), 17 Mar. 1994; JP-A-05 335614 (Idemitsu Kosan Co. Ltd), 17 Dec. 1993.

Fujishima et al., "Electrochemical Photolysis of Water at a Semiconductor Electrode", *Nature*, vol. 238, Jul. 7, 1972, pp. 37–38.

A.J. Nozik, "Photochemical diodes", *Applied Physics Letters*, vol. 30, No. 11, Jun. 1, 1977, pp. 567–569.

Miller et al., "Photoelectrochemical Behavior of $C_{60}$ Films", *J. Am. Chem. Soc.*, vol. 11, No. 16, 1991, pp. 6291–6293, no month available.

Tsubomura, "Photoelectrochemistry and Energy Conversion", 1980, pp. 180–182, no month available.

*Primary Examiner*—John Niebling
*Assistant Examiner*—Brendan Mee
*Attorney, Agent, or Firm*—Armstrong, Westerman, Hattori, McLeland & Naughton

[57] ABSTRACT

A photo-electric chemical apparatus comprising an electrolyte, a first electrode having an n-type semiconductor member disposed to be in touch with the electrolyte and a second electrode having a carbon cluster member disposed to be in touch with the electrolyte. The first and second electrodes are short-circuited and irradiated with a light beam to thereby generate oxygen and hydrogen. The first electrode is a laminated member consisting of a light transmitting glass, a transparent conducting layer and an n-type semiconductor layer. The second electrode is a laminated member consisting of a light transmitting glass, a transparent conducting layer and a carbon cluster thin film.

4 Claims, 2 Drawing Sheets

PHOTO-ELECTRIC CHEMICAL APPARATUS USING CARBON CLUSTER ELECTRODE

This is a Continuation of application Ser. No. 08/534,001 filed Sep. 25, 1995, abandoned, which is a Continuation of Ser. No. 08/291,952, filed Aug. 17, 1994, abandoned.

BACKGROUND OF THE INVENTION

1. Field of the Invention

The present invention relates to a photo-electric chemical apparatus and particularly to a photo-electric chemical apparatus for generating hydrogen and oxygen from water by utilizing light energy.

2. Description of the Prior Art

It has long been known that water is decomposed to oxygen and hydrogen in a photo-electric chemical apparatus structured such that an n-type semiconductor electrode and a platinum electrode are soaked into an electrolyte is irradiated with a light beam (for example, "Nature", No. 283, p37, by Fujishima et al. 1972). Such a phenomenon occurs due to the fact that charge separation of electrons and holes caused by irradiation of the light beam on the semiconductor results from a Schottky-barrier-type field distribution at the interface between the semiconductor and the electrolyte. When the semiconductor electrode is irradiated with the light beam with the semiconductor electrode being connected with the platinum electrode through a lead wire, electrons pushed out of a conduction band of the semiconductor electrode are accumulated in the platinum electrode, thereby causing the platinum electrode to charge in the direction of negative potential. If a voltage difference between both electrodes is equal to or higher than 1.23 Ev which is required for decomposition of water and an electric potential of the platinum electrode is more negative than the reduction level of the hydrogen ion, water is decomposed, resulting in the generation of oxygen and hydrogen. Actually, hydrogen is generated when an electric potential of the platinum electrode goes in the negative direction further from the reduction voltage of the hydrogen ion beyond a hydrogen overvoltage of the platinum. It is noted that a platinum electrode is often used because a hydrogen overvoltage of the platinum is low, that is, platinum is a metal having an electric potential for hydrogen ion reduction which is the closest to a theoretical value.

Typically, titanium dioxide is used as a semiconductor electrode for the electrolysis of water, because it has a wide band gap and is very stable in the electrolyte.

However, since a flat band potential of a titanium dioxide semiconductor is substantially equal to a reduction potential of hydrogen ion, a potential of the titanium dioxide semiconductor must come nearer to the flat band condition in order to cause hydrogen ion reduction. But, electrons and holes generated by light beam are not immediately separated and, if separated, couple again at a high rate, causing a photo current to become remarkably small. For this reason, in a photo-electric chemical apparatus employing a titanium dioxide semiconductor electrode and a platinum electrode, little photo current flows when both electrodes are short-circuited and irradiated with light beam. Thus, it is required to apply a negative bias to the platinum electrode in order to allow a large amount of photo current resulting from the oxidation and reduction of water to flow ("Photo-Electric Chemistry and Energy Conversion" by Hiroshi Tsubomura, Tokyo Chemistry Coterie, p181–182).

In a semiconductor, for example, iron oxide, tungsten oxide, tin oxide, lead oxide, indium oxide and iron titanic acid, etc. where a flat band potential is positive relative to the reduction voltage of hydrogen ion and a band gap is 1.5 to 3 Ev, a photo current does not flow even if such a semiconductor is short-circuited to a platinum electrode. Therefore, it is necessary to apply a large negative bias to the platinum electrode in order to achieve effective generation of hydrogen and oxygen.

Namely, electrolysis of water by means of a light energy using a combination of a platinum electrode and a semiconductor, such as titanium dioxide, iron oxide, tungsten oxide, tin oxide, lead oxide, indium oxide and iron titanic acid essentially requires the application a bias voltage. This results in the necessity of extra associated apparatuses and extra supplies of energy.

Various apparatuses for realizing electrolysis of water by means of a light energy using a semiconductor electrode have been heretofore proposed in Japanese Patent Laid-Open Nos. 62-48928, 53-43488, 54-4582 and 63-231883.

SUMMARY OF THE INVENTION

In order to overcome the problems of the prior art, it is an object of the present invention to provide a photo-electric chemical apparatus which can generate hydrogen and oxygen with light energy without the application of any bias voltage across the electrodes.

It is another object of the present invention to provide a photo-electric chemical apparatus which can adjust an amount of hydrogen and oxygen generated by means of the irradiation of a light beam by applying a variable voltage across the electrodes.

According to one aspect of the present invention, a photo-electric chemical apparatus comprises an electrolyte; a first electrode having an n-type semiconductor member disposed to be in touch with the electrolyte; and a second electrode having a carbon cluster member disposed to be in touch with the electrolyte, the first and second electrodes being short-circuited and irradiated with a light beam to thereby generate oxygen and hydrogen.

The first electrode is preferably a laminated member consisting of a light transmitting glass, a transparent conducting layer and an n-type semiconductor layer.

The second electrode is preferably a laminated member consisting of a light transmitting glass, a transparent conducting layer and a carbon cluster thin film.

The photo-electric chemical apparatus of the present invention can be provided with a variable bias source which can apply a variable bias voltage across the transparent conducting layers of the first and second electrodes. By adjusting the bias voltage, the apparatus can vary any amount of oxygen and hydrogen to be generated therefrom.

The n-type semiconductor electrode and the carbon cluster electrode are soaked in the electrolyte or set in contact with the electrolyte and these electrodes are short-circuited. When these electrodes are irradiated with a light beam, oxidation of water occurs on the surface of the n-type semiconductor electrode, while reduction to the hydrogen ion occurs on the surface of the carbon cluster electrode. That is, water contained in the electrolyte is decomposed to generate hydrogen and oxygen.

Above and other objects and advantages of the present invention will become apparent from the following detailed description taken with reference to the accompanying drawings.

BRIEF DESCRIPTION OF THE ACCOMPANYING DRAWINGS

FIG. 1 is a schematic diagram illustrating the structure of a photo-electric chemical apparatus to which the present invention is applied;

FIGS. 2(A) and 2(B) are diagrams respectively illustrating an example of an n-type semiconductor electrode of FIG. 1 and an example of a carbon cluster electrode of FIG. 1; and FIG. 3 is a characteristic diagram for explaining operations of the photo-electric chemical apparatus of the present invention in comparison with the prior art.

DESCRIPTION OF THE PREFERRED EMBODIMENT

A preferred embodiment of the photo-electric chemical apparatus of the present invention will be explained in detail with reference to the accompanying drawings.

Figure 1:
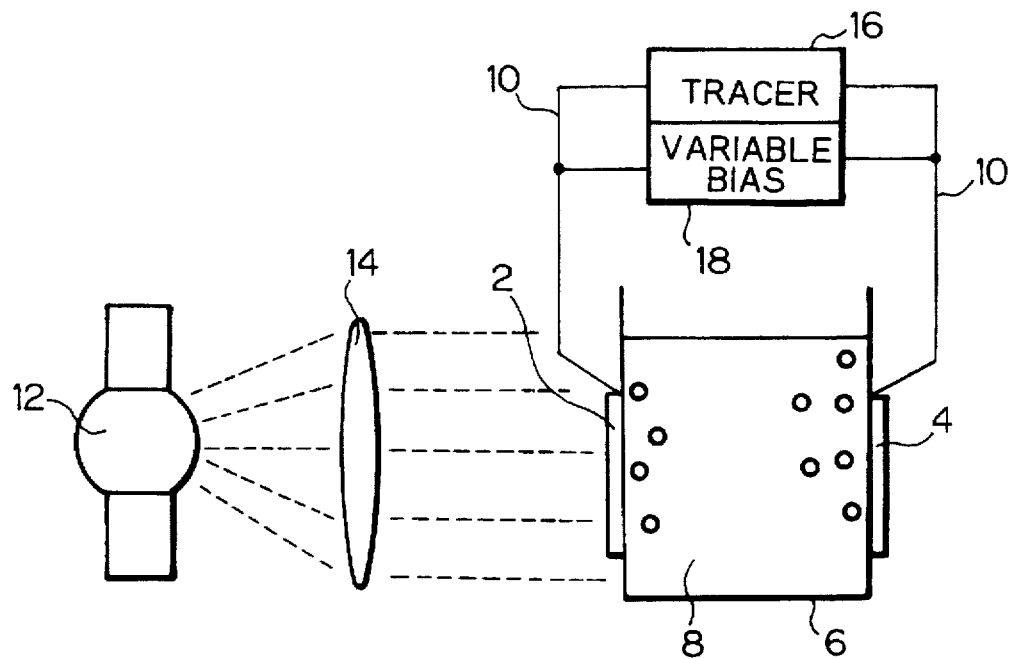

FIG. 1 is a schematic diagram of a photo-electric chemical apparatus of the present invention. This apparatus comprises a vessel 6 provided with an n-type semiconductor electrode 2 and a carbon cluster electrode 4. An electrolyte 8 is within vessel 6. These electrodes 2, 4 are short-circuited with a lead wire 10. It is noted that, as the n-type semiconductor electrode 2, titanium dioxide, iron oxide, tungsten oxide, tin oxide, lead oxide, indium oxide or iron titanic acid is used. To a carbon cluster used for the electrode 4, an isolated material of a fullerene of $C_{60}$ or $C_{70}$ or a mixture thereof is suitable. To the electrolyte 8, water, an alkali solution including sodium hydroxide or potassium hydroxide, or an acid solution including chloric acid or sulfuric acid are preferable.

Figure 2A:
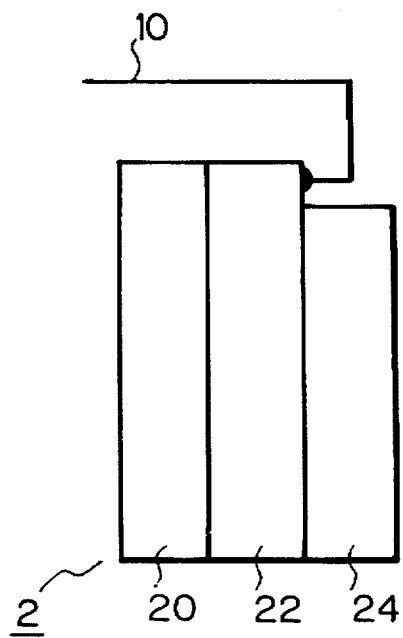
Figure 2B:
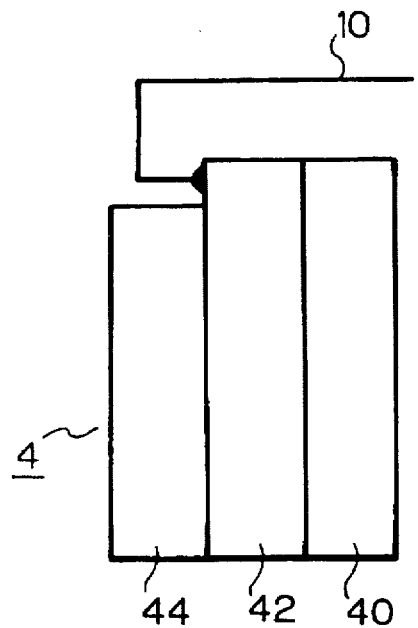

FIG. 2(A) illustrates a detailed structure of the n-type semiconductor electrode 2, while FIG. 2(B) illustrates a detailed structure of the carbon cluster electrode 4. The electrode 2 can be formed by coating one surface of a light transmitting glass 20 with tin oxide to form a transparent conducting layer 22 and then covering the conducting layer 22 with a fine particle thin film 24 of titanium oxide (n-type semiconductor) by a sol-gel method. The electrode 4 can be formed by coating one surface of a light transmitting glass 40 with tin oxide to form a transparent conducting layer 42 and then covering the conducting layer 42 with a $C_{60}$ carbon cluster thin film 44 obtained by a benzene solution cast method. The electrodes 2 and 4 being formed in such a manner as shown in FIGS. 2(A) and 2(B), titanium dioxide fine particle thin film 24 and $C_{60}$ carbon cluster thin film 44 are in contact with the electrolyte 8.

In order to irradiate the electrode 2 a xenon lamp 12 and a lens system 14 for converting the light emitted from the xenon lamp 12 to a parallel light beam are provided outside of the vessel 6. The titanium dioxide fine particle thin film 24, when irradiated by the xenon lamp 12, is excited and generates electrons and holes. Simultaneously, the carbon cluster thin film 44 is also irradiated with the light beam passing through the electrode 2.

In the middle of the lead wire 10, a current/voltage tracer 16 is inserted to evaluate the generation of hydrogen. Hydrogen is generated by transfer of electrons among the electrode interfaces, water molecules and hydrogen ion. When a closed loop is established by short-circuiting the electrodes 2, 4 with the lead wire 10, a current flows through the lead wire 10 simultaneously with the generation of hydrogen. This current is measured with the current/voltage tracer 16. The current/voltage tracer 16 incorporates a variable bias source 18 which can operate to apply a variable bias voltage across the electrodes 2 and 4.

Figure 3:
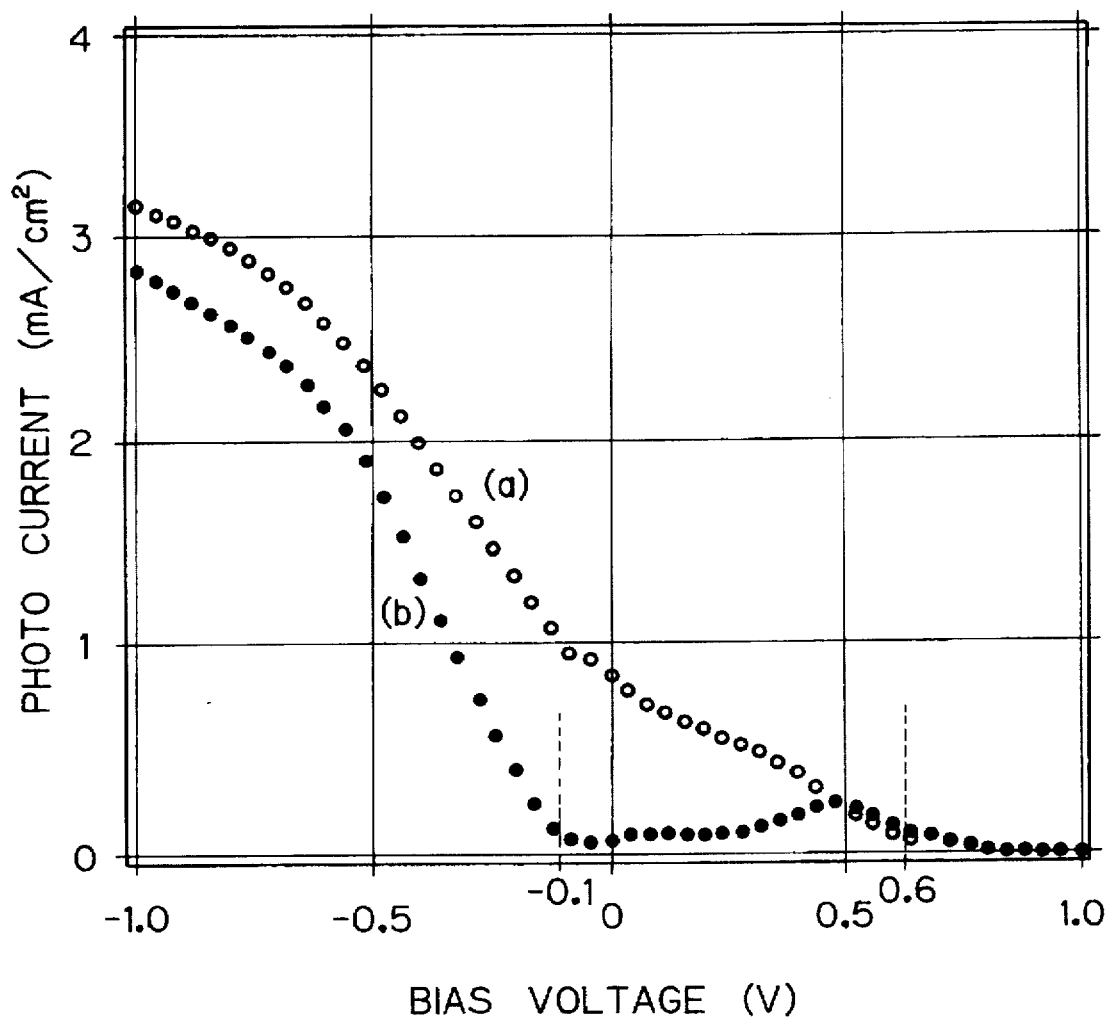

FIG. 3 shows bias voltage-photo current characteristics obtained by tests conducted on a photo-electric chemical apparatus of the present invention and a prior art apparatus. A bias voltage applied across both electrodes is plotted along the horizontal axis, while a photo current flowing through the lead wire 10 along the vertical axis. A curve (a) shows a current/voltage characteristic of a photo-electric chemical apparatus using the carbon cluster electrode 4 according to the present invention. According to this characteristic curve (a), it can be seen that a photo current rises at about 0.6 V and flows even at zero bias voltage. This shows that water is decomposed by means of irradiation of light beam on the electrodes 2, 4 to generate hydrogen without applying any bias voltage.

A curve (b) shows the result of measurement using a platinum electrode, which has been considered to be effective for the generation of hydrogen, in place of the carbon cluster electrode 4. According to the curve (b), it can be seen that a photo current rises at about −0.1 V and that the application of a bias voltage of about −0.3 V is required to generate a photo current similar to that generated by the carbon cluster electrode.

Such results of measurement as described with reference to FIG. 3 prove that a photo-electric chemical apparatus according to the present invention can effectively generate hydrogen without applying any bias voltage across the electrodes. Using a solar beam, a photo-electric chemical apparatus of the present invention can effectively generate hydrogen and oxygen with a simplified structure without supplying any electrical energy to the apparatus.

The invention has been described in detail with particular reference to a certain embodiment thereof, but it will be understood that variations and modifications can be effected within the spirit and scope of the invention. For example, the carbon cluster electrode 4 can be replaced with a carbon cluster covered electrode.

What is claimed is:

1. A photo-electric chemical apparatus comprising:

an electrolyte;

a first electrode having an n-type semiconductor member disposed to be in touch with said electrolyte, said first electrode being transparent;

a second electrode having a fullerene member disposed to face to said n-type semiconductor member via said electrolyte;

means for electrically interconnecting said first electrode and said second electrode;

means for supporting said electrolyte, said first electrode and said second electrode; and means for illuminating said first electrode and for illuminating said second electrode through said first electrode and said electrolyte;

wherein said photo-electric chemical apparatus generates hydrogen without application of any bias voltage between said electrodes.

2. An apparatus according to claim 1, wherein said first electrode is a laminated member consisting of a light transmitting glass, a transparent conducting layer and an n-type semiconductor layer and wherein said second electrode is a laminated member consisting of a light transmitting glass, a transparent conducting layer and a fullerene thin film.

3. An apparatus according to claim 1, further comprising a variable bias source adapted to apply a variable bias voltage across said first electrode and said second electrode whereby an amount of oxygen and hydrogen generated by said apparatus can be changed by adjusting said bias voltage.

4. An apparatus according to claim 3, wherein said first electrode is a laminated member consisting of a light transmitting glass, a first transparent conducting layer and an n-type semiconductor layer, wherein said second electrode is a laminated member consisting of a light transmitting glass, a second transparent conducting layers.

* * * * *